United States Patent
Matsuda et al.

(10) Patent No.: US 9,904,052 B2
(45) Date of Patent: Feb. 27, 2018

(54) PROJECTION APPARATUS HAVING POLARIZING PLATE WHICH ABSORBES AND REFLECTS OUTPUT LIGHT, AND VEHICLE

(71) Applicant: NITTO DENKO CORPORATION, Ibaraki-shi, Osaka (JP)

(72) Inventors: Shoichi Matsuda, Ibaraki (JP); Yoshiaki Asanoi, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 0 days.

(21) Appl. No.: 15/306,930

(22) PCT Filed: May 19, 2015

(86) PCT No.: PCT/JP2015/064342
§ 371 (c)(1),
(2) Date: Oct. 26, 2016

(87) PCT Pub. No.: WO2015/186506
PCT Pub. Date: Dec. 10, 2015

(65) Prior Publication Data
US 2017/0052370 A1    Feb. 23, 2017

(30) Foreign Application Priority Data

Jun. 6, 2014 (JP) .................................. 2014-118057
May 18, 2015 (JP) .................................. 2015-101140

(51) Int. Cl.
*G02B 27/01*     (2006.01)
*G03B 21/20*     (2006.01)
(Continued)

(52) U.S. Cl.
CPC ........... *G02B 27/0101* (2013.01); *G02B 1/08* (2013.01); *G02B 5/30* (2013.01); *G02B 27/01* (2013.01);
(Continued)

(58) Field of Classification Search
CPC ..................... G03B 21/14; G03B 21/2073; C09K 19/3068; C09K 19/3052; C09K 19/3497;
(Continued)

(56) References Cited

U.S. PATENT DOCUMENTS 5,354,512 A * 10/1994 Ogino .................... C09B 45/24
                                                        252/585
2004/0135742 A1    7/2004 Weber et al.
(Continued)

FOREIGN PATENT DOCUMENTS

JP    2006-512622 A    4/2006
JP    2009-276618 A    11/2009
(Continued)

OTHER PUBLICATIONS

International Search Report dated Jul. 14, 2015, issued in counterpart International Application No. PCT/JP2015/064342 (2 pages).
(Continued)

*Primary Examiner* — Sultan Chowdhury
(74) *Attorney, Agent, or Firm* — Westerman, Hattori, Daniels & Adrian, LLP

(57) ABSTRACT

The present invention provides a projection apparatus capable of clearly displaying a projected image, and allowing the sight behind the projected image to be viewed to a sufficient degree. A projection apparatus (1) of the present invention includes a light irradiation device (3) configured to emit an output light (2) having one polarized light component, and a polarizing plate (4) including a polarizer (41) irradiated with the output light (2), wherein in the polarizing
(Continued)

plate (4), an absorption axis is arranged to absorb and reflect the output light (2) by the polarizing plate, reflectance of the polarizing plate (4) for the output light (2) is 10% or more, and single transmittance of the polarizing plate (4) is in the range of 30% to 90%.

7 Claims, 4 Drawing Sheets

(51) Int. Cl.
    *G02B 5/30*     (2006.01)
    *G02B 1/08*     (2006.01)
    *G03B 21/604*     (2014.01)
    *G03B 21/62*     (2014.01)

(52) U.S. Cl.
    CPC ....... *G03B 21/2073* (2013.01); *G03B 21/604* (2013.01); *G03B 21/62* (2013.01); *G02B 2027/0118* (2013.01)

(58) Field of Classification Search
    CPC ...... C09K 19/3861; G02B 5/30; G02B 5/223; G02B 5/285; G02B 5/3025; G02B 5/3033
    See application file for complete search history.

(56) References Cited

U.S. PATENT DOCUMENTS

| 2005/0270655 | A1 | 12/2005 | Weber et al. |
| 2006/0044514 | A1* | 3/2006 | Ushigome ............ G02B 5/3041 353/20 |
| 2007/0079740 | A1 | 4/2007 | Sadarnitsu et al. |
| 2013/0235457 | A1 | 9/2013 | Matsuda et al. |

FOREIGN PATENT DOCUMENTS

| JP | 2010-26024 A | 2/2010 |
| JP | 2014-85657 A | 5/2014 |

OTHER PUBLICATIONS

Search Report dated Jan. 8, 2018, issued in counterpart European Application No. 15802721.9 (35 pages).

* cited by examiner

PROJECTION APPARATUS HAVING POLARIZING PLATE WHICH ABSORBES AND REFLECTS OUTPUT LIGHT, AND VEHICLE

TECHNICAL FIELD

The present invention relates to a projection apparatus and the like.

BACKGROUND ART

A conventionally known projection apparatus projects light emitted from a light irradiation device (e.g., a projector) onto a reflector (e.g., a screen). Reflection of the light projected onto the screen enables an observer to perceive an image on the screen. However, the screen used in such projection apparatus is usually opaque. Such opaque screen prevents the observer from perceiving (viewing) the sight behind the screen through the screen from inside the projection apparatus (i.e., from the light irradiation device side).

In recent years, conventional projection apparatuses have been modified to thus develop projection apparatuses (head-up displays) that each use a reflector having light transmissivity (light transmissive reflector). For example, Patent Document 1 discloses an apparatus for displaying an image by reflecting light emitted from a light irradiation device toward the windshield of an automobile that serves as a light transmissive reflector.

A light transmissive reflector not only reflects light emitted from a light irradiation device, but also passes light incident from behind the light transmissive reflector. Thus, an observer not only perceives the image projected onto the light transmissive reflector, but can also view the sight behind the light transmissive reflector therethrough. This enables the driver of an automobile to see driving information, such as location coordinates and a speedometer indication, displayed on the windshield that serves as a light transmissive reflector, and at the same time, to view the sight outside the automobile through the windshield. Thus, the driver can obtain driving information during driving the automobile without moving his or her eyes away from the traveling direction.

When a head-up display is applied to a vehicle (e.g., an automobile) as described above, the density of an image displayed on the light transmissive reflector is particularly important for safe driving of the vehicle.

More specifically, too high a density of the image displayed on the light transmissive reflector presents certain difficulties in viewing the sight outside the vehicle through the light transmissive reflector, and may thus prevent safe driving of the vehicle. Conversely, too low a density of the image displayed on the light transmissive reflector prevents the driver from obtaining sufficient driving information. In this case, the driver tends to pay more attention on the displayed image to obtain sufficient driving information. This, in turn, distracts attention of the driver from the sight outside the vehicle, and may thus prevent safe driving of the vehicle.

Thus, if a head-up display is applied to a vehicle, the density of an image projected needs to be low enough to allow the driver to view the sight outside the vehicle through the light transmissive reflector to a sufficient degree, and also high enough to allow the driver to quickly read the driving information.

[Patent Document 1] JP 2014-85657 A

SUMMARY OF THE INVENTION

An object of the present invention is to provide a projection apparatus capable of clearly displaying a projected image, and allowing the sight behind the projection apparatus to be viewed to a sufficient degree.

A projection apparatus of the present invention includes a light irradiation device configured to emit an output light having one polarized light component, and a polarizing plate including a polarizer irradiated with the output light (a polarizer is an object to be irradiated with the output light), wherein in the polarizing plate, an absorption axis is arranged to absorb and reflect the output light by the polarizing plate, reflectance of the polarizing plate for the output light is 10% or more, and single transmittance of the polarizing plate is in the range of 30% to 90%.

Preferably, the reflectance of the polarizing plate for the output light is 90% or less. Furthermore, preferably, the output light consists substantially of the one polarized light component.

Preferably, the polarizer contains an aromatic disazo compound represented by the general formula (1) as described below.

Preferably, the output light is linearly polarized light, circularly polarized light, or elliptically polarized light. Furthermore, preferably, the light irradiation device is a projector, a liquid crystal display, an organic electroluminescence light-emitting device, or a laser projector. Preferably, the polarizing plate serves as a light control window capable of adjusting an amount of light transmission by means of electric power.

In another aspect of the present invention, a vehicle including the projection apparatus is provided.

The projection apparatus of the present invention is capable of clearly displaying a projected image, and allowing the sight behind the polarizing plate to be perceived (viewed) to a sufficient degree.

BRIEF DESCRIPTION OF THE DRAWINGS

FIG. 1(a) is a front view and FIG. 1(b) is a side view of the polarizer.

DESCRIPTION OF THE PREFERRED EMBODIMENTS

The present invention will be described below in detail.

As used herein, the phrase "inside the projection apparatus" refers to the side on which the light irradiation device of the projection apparatus is disposed, while the phrase "outside the projection apparatus" refers to the side opposite the inside (i.e., the side without the light irradiation device) with respect to the polarizing plate.

It is to be understood that angle values and relative angular relationships (e.g., perpendicular/orthogonal, parallel, 45°) presented herein may include an error within a certain range accepted in the technical field of the present invention. For example, the term "parallel" may also mean that two elements are out of parallel with each other within a range of ±5°, preferably ±3°.

As used herein, the phrase "PPP to QQQ" means "PPP or more and QQQ or less."

A projection apparatus of the present invention includes a light irradiation device and a polarizing plate.

Figure 1:
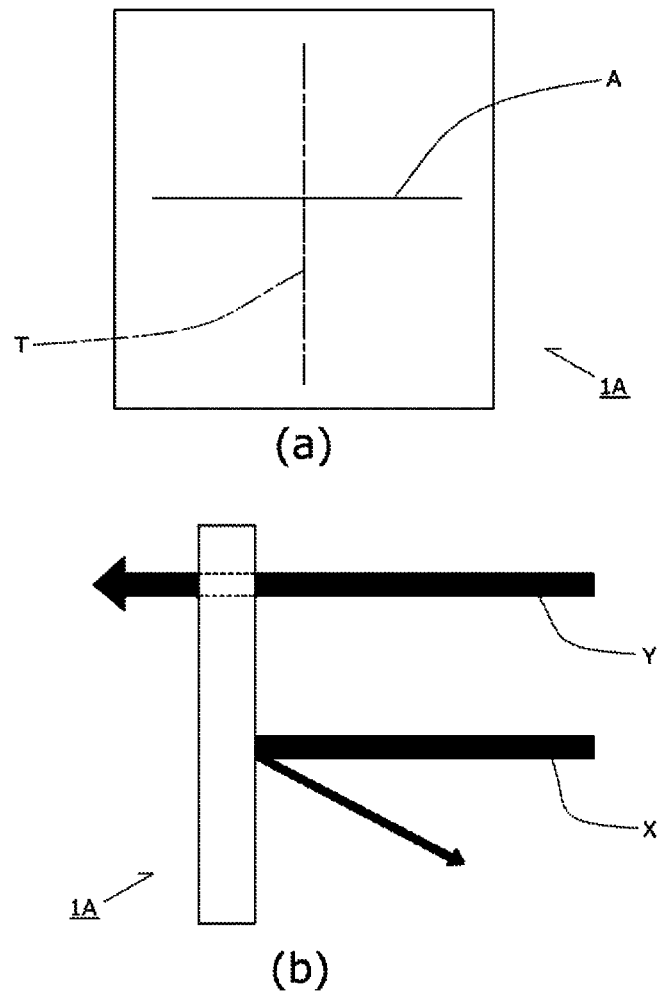
FIGS. 1(a) and 1(b) are graphical illustrations of effects of a polarizer for use in the present invention.

The light irradiation device emits an output light having one specific polarized light component to the polarizing plate. The polarizing plate is disposed to absorb and reflect the output light. In other words, the polarizing plate serves as a reflector for reflecting the output light in the present invention. The polarizing plate includes a polarizer. Effects of the polarizer for use in the present invention will be described below with reference to FIGS. 1(a) and 1(b). For purposes of illustration, FIG. 1(b) illustrates the light incident upon the polarizer as the black arrow. The width of a black arrow indicates the light quantity. These notations also apply to FIGS. 2 and 3.

A polarizer extracts linearly polarized light having a particular oscillation direction of electric field (hereinafter referred to simply as "oscillation direction") from natural light (non-polarized light). More specifically, as illustrated in FIG. 1(a), a polarizer 1A has an absorption axis A and a transmission axis T in the plane of the polarizer 1A. The absorption axis A and the transmission axis T are perpendicular to each other in the plane of the polarizer 1A. As illustrated in FIG. 1(b), the polarizer 1A absorbs a linearly polarized light X having an oscillation direction parallel to the absorption axis direction (direction in which the absorption axis A extends), and passes a linearly polarized light Y having an oscillation direction parallel to the transmission axis direction (direction in which the transmission axis T extends) (that is to say, its oscillation direction is perpendicular to that of the linearly polarized light X). Since the polarizer for use in the present invention is a reflective polarizer, the polarizer 1A absorbs a certain portion of the linearly polarized light X by the absorption axis A of the polarizer 1A, and reflects the remaining unabsorbed portion of the linearly polarized light X at the surface of the polarizer 1A (see FIG. 1(b)).

In the present invention, the polarizing plate is disposed so that the output light is absorbed and reflected by the absorption axis, and the reflectance of the polarizing plate for the output light is 10% or more. Thus, the observer perceives the light that was reflected (i.e., reflected light) as a sharp projected image.

The polarizing plate of the present invention may be formed only of the polarizer, or formed of a laminate of the polarizer and of one or more other layers. If the polarizing plate is formed of a laminate of the polarizer and of one or more other layers, the absorption axis of the polarizing plate refers to the absorption axis of the polarizer included in the polarizing plate, and the transmission axis of the polarizing plate refers to the transmission axis of the polarizer included in the polarizing plate.

Hereinafter, example embodiments of the present invention will be described.

First Embodiment

Figure 2:
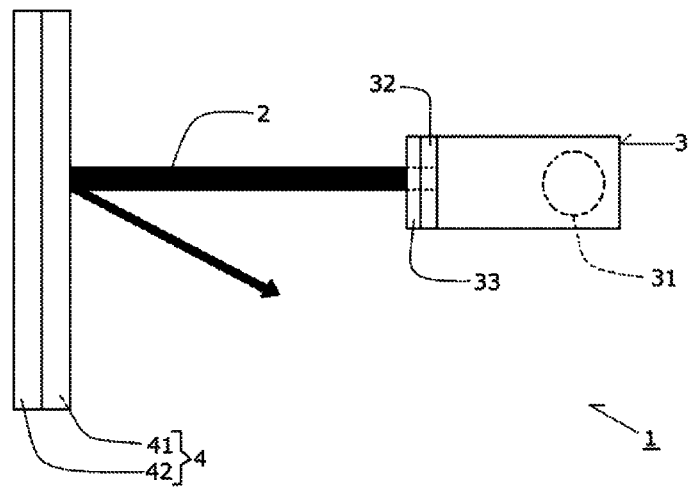
FIG. 2 is a conceptual diagram illustrating a projection apparatus of the present invention according to a first embodiment.

FIG. 2 is a conceptual diagram of a projection apparatus according to a first embodiment of the present invention.

As illustrated in FIG. 2, a projection apparatus 1 includes a light irradiation device 3 and a polarizing plate 4. The light irradiation device 3 emits a light having one specific polarized light component as an output light 2. The polarizing plate 4 absorbs and reflects the output light 2 by the absorption axis of the polarizing plate 4. The polarizing plate 4 is disposed on a virtual line extending in the outgoing direction of the output light 2 from the light irradiation device 3. The output light 2 is thus projected onto the polarizing plate 4.

In this embodiment, the light irradiation device 3 includes a light source 31 therein. A light emitted by the light source 31 is output from the light irradiation device 3 through a lens 32 and another polarizing plate 33 attached on the lens 32. The polarizing plate 4, which serves as a reflector, is formed of a laminate of a polarizer 41 and a substrate 42. The polarizing plate 4 is configured such that the polarizer 41 is disposed at the innermost position (i.e., position nearest to the light irradiation device 3).

In this embodiment, the output light 2 is linearly polarized light. The polarizing plate 4 is disposed so that its absorption axis direction is parallel to the oscillation direction of the output light 2 (linearly polarized light). In other words, the polarizing plate 4 is disposed so that its transmission axis direction is perpendicular to the oscillation direction of the output light 2.

Thus, the polarizing plate 4 absorbs a portion of the output light 2 (linearly polarized light) by the absorption axis of the polarizing plate 4, and reflects the remaining portion thereof at the surface of the polarizing plate 4 back toward the light irradiation device 3.

(Light Irradiation Device)

The light irradiation device emits an output light having one specific polarized light component toward the polarizing plate. The output light has at least one specific polarized light component. This specific polarized light component may be linearly polarized light, circularly polarized light, or elliptically polarized light. In this embodiment, this specific polarized light component is linearly polarized light.

As used herein, the phrase "one specific polarized light component" is a generic term for polarized light components having a particular oscillation direction. That is to say, "one specific polarized light component" may consist of a single polarized light component (let us denote this by "polarized light component A") having a particular oscillation direction and a particular wavelength, or may further have, in addition to the polarized light component A, a polarized light component (polarized light component B) having the same oscillation direction as that of the polarized light component A but a wavelength different from that of the polarized light component A. In other words, the specific polarized light component may include not only a single polarized light component, but also another polarized light component having the same oscillation direction. On the contrary, the phrase "one specific polarized light component" as used herein does not include a polarized light component (polarized light component C) having a same wavelength as that of the polarized light component A, but having a different oscillation direction from that of the polarized light component A; nor a polarized light component (polarized light component D) having a wavelength and an oscillation direction both different from those of the polarized light component A. The polarized light components C and D are herein deemed as polarized light components different from the specific polarized light component (hereinafter each referred to as "second polarized light component").

More specifically, if the output light is red in color, the output light may include, for example, a red light component (polarized light component A) having a wavelength of 700 nm and another red light component (polarized light component B) having a wavelength of 750 nm insofar as the oscillation directions of these red light components coincide with each other.

If the output light includes a red and a blue light components, the output light may include, for example, a red light component (polarized light component A) having a wavelength of 700 nm and a blue light component (polarized light component B) having a wavelength of 450 nm insofar as the oscillation directions of the red and blue light components coincide with each other.

In either case, the polarized light component A and the polarized light component B have the same oscillation direction of polarized light, and are thus absorbed and reflected by the polarizing plate by the absorption axis of the polarizing plate.

The output light is preferably visible light having a wavelength in a range of 360 nm to 830 nm. Use of multiple polarized visible light components permits projection of a colorful image onto the polarizing plate.

The output light may include not only one specific polarized light component, but also a second polarized light component having an oscillation direction different from that of the specific polarized light component. However, when the output light includes a second polarized light component, the output light preferably does not include a polarized light component having an oscillation direction perpendicular to that of the specific polarized light component. If the output light includes a second polarized light component having an oscillation direction perpendicular to that of the specific polarized light component, which means that the oscillation direction of the second polarized light component is parallel to the transmission axis direction of the polarizing plate, the second polarized light component (a portion of the output light) passes outside the polarizing plate therethrough. This presents a problem in that the projected image may be seen from outside the projection apparatus.

The output light preferably consists substantially of one specific polarized light component.

The phrase "to consist substantially of one specific polarized light component" is intended to mean not only the output light consisting of only the specific polarized light component, but also an output light further including a second polarized light component to the extent accepted in the technical field of the present invention.

More specifically, the output light may include 90% or more of one specific polarized light component and 10% or less of second polarized light component, and preferably 95% or more of one specific polarized light component and 5% or less of second polarized light component.

The projected image may include private information (e.g., destination of the automobile) when the projection apparatus according to the present invention is applied to a navigation system on an automobile. In such case, it is desirable that the projected image not be seen from outside the projection apparatus.

In this regard, an output light consisting substantially of one specific polarized light component is mostly absorbed or reflected by the absorption axis of the polarizing plate. This causes the output light to be less likely to pass outside the projection apparatus, and thus makes it difficult for the projected image to be seen from outside the projection apparatus.

The light irradiation device is not particularly limited as long as the light irradiation device can emit an image (output light) corresponding to image information to be displayed on the polarizing plate. For example, a conventional known projector, organic electroluminescence (organic EL) light-emitting device, liquid crystal display, laser projector, or a similar device may be used. The light irradiation device includes therein a light source that emits light. For example, a projector includes a halogen lamp as the light source, and an organic EL light-emitting device includes an organic light-emitting layer as the light source.

In this embodiment, the light irradiation device 3 is, for example, a projector including a halogen lamp therein as the light source 31 as illustrated in FIG. 2.

If only one specific polarized light component is used as the output light, and the light source of the light irradiation device emits only the specific polarized light component, the light emitted from the light source can be used as the output light without any adjustment or modification. Meanwhile, if the light source emits non-polarized light or light having one specific polarized light component and a second polarized light component, extraction of the specific polarized light component from the light emitted from the light source enables the use of the extracted polarized light component as the output light.

For example, as illustrated in FIG. 2, when a projector using a halogen lamp as the light source 31 is used as the light irradiation device 3, attachment of the polarizing plate 33 on the surface of the lens 32 enables the specific polarized light component to be extracted as the output light 2. Note that, for distinction between the polarizing plate 33 for extracting the output light from the light irradiation device and the polarizing plate 4 used as the reflector for the output light 2, the polarizing plate 33 is hereinafter referred to as "extraction polarizing plate."

Due to the need for the light irradiation device to emit one specific polarized light component as the output light, the extraction polarizing plate attached to the lens has a transmission axis for passing the specific polarized light component (output light) and an absorption axis for absorbing the second polarized light component having an oscillation direction perpendicular to that of the specific polarized light component.

Note that, in this embodiment, the output light is linearly polarized light, and therefore the extraction polarizing plate may be formed only of a polarizer. However, as described later herein, if circularly polarized light or elliptically polarized light is used as the output light, the extraction polarizing plate includes the polarizer and a retardation film.

The polarizer for use in the extraction polarizing plate is not particularly limited as long as the polarizer can extract the output light (one specific polarized light component) emitted from the light source. Examples of such polarizer include, for example, a hydrophilic polymer film dyed with iodine or with dichroic dye. Such a polarizer can typically be produced by swelling a film, thereafter dying the swollen film with iodine or dichroic dye, crosslinking the dyed film using a crosslinking agent such as boric acid, and then drawing the crosslinked product, followed by drying the drawn product.

(Polarizing Plate)

The polarizing plate absorbs a portion of the output light and reflects the remaining portion thereof (unabsorbed output light) by the absorption axis thereof. In other words, the polarizing plate serves as a reflector for the output light.

The reflectance of the polarizing plate for the output light is 10% or more. Thus, the projection apparatus of the present invention is capable of projecting a sharp image onto the polarizing plate. In addition, the single transmittance of the polarizing plate in a range of 30% to 90% enables the observer to view the sight behind the polarizing plate from inside the projection apparatus through the polarizing plate to a sufficient degree.

The reflectance is 10%, preferably 12% or more, more preferably 15% or more, particularly preferably 18% or more. Upper limit of the reflectance is not particularly limited, but the reflectance is too high, projected image is displayed too clearly on the polarizing plate, and thus makes it difficult to view the sight outside the polarizing plate (projection apparatus). From this point of view, the reflectance is preferably 90% or less, more preferably 50% or less, and further preferably 40% or less, particularly preferably 30% or less.

Furthermore, the single transmittance is 30% or more, preferably 35% or more, more preferably 37% or more, particularly preferably 40% or more. The single transmittance is 90% or less, preferably 85% or less, more preferably 80% or less, particularly preferably 70% or less.

In addition, the value of the reflectance of the polarizing plate is based on the wavelength of 590 nm at the temperature of 23° C. This condition also applies to the value of single transmittance of the polarizing plate.

In this embodiment, the polarizing plate 4 includes the polarizer 41 and the substrate 42, and the polarizer 41 is disposed at the innermost position (i.e., position nearest to the light irradiation device 3) as illustrated in FIG. 2. This configuration prevents the phase of the output light 2 (linearly polarized light) from being changed by the substrate 42, and thus permits the polarizing plate 4 to stably reflect 10% or more of the output light 2.

However, the polarizing plate may be configured such that the polarizer is disposed on the outer side of the substrate (or such that the substrate is disposed on the inner side of the polarizer). In this case, the substrate is preferably substantially optically isotropic, or preferably is not substantially optically anisotropic. This is because optical anisotropy of the substrate may change the phase of the output light (linearly polarized light) by the substrate, and may thus cause the output light to be less absorbed by the absorption axis of the polarizer, and less reflected at the surface of the polarizer.

Herein, "the substrate is substantially optically isotropic" includes not only the case in which an ellipsoid of a refractive index of the substrate is nx=nz=ny, but also the case where an ellipsoid of a substrate is nx≈nz≈ny.

Specifically, "the substrate is substantially optically isotropic" includes the case in which an absolute value of an in-plane birefringence Δnxy (nx−ny) of the substrate, and an absolute value of a birefringence in a thickness direction Δnxz (nx−nz) are 0.0005 or less, preferably 0.0001 or less, and more preferably 0.00005 or less.

In addition, in this specification, "nx" represents a refractive index in a direction (X-axis direction) in which the refractive index is maximized in a plane of the measurement objective (here, a substrate) measured with reference to 23° C. and at a wavelength of 590 nm, "ny" represents a refractive index in a direction (Y-axis direction) orthogonal to the X-axis direction in the plane, and "nz" represents a refractive index in a direction (thickness direction) orthogonal to the X-axis direction and the Y-axis direction.

Further, in this embodiment, the polarizing plate only includes a polarizer and a substrate, but may include the other layer except for the polarizer and the substrate. The other layer is not particularly limited, and if this layer is disposed inside of the polarizer, the layer is preferably substantially optically isotropic.

The substrate is not particularly limited, but any material including, for example, a glass substrate, a quartz substrate, a resin film substrate, a liquid crystal film substrate, and a silicon substrate may be used. As described later herein, the polarizer for use in the polarizing plate of the present invention can be readily formed by applying coating liquid on the substrate, and then drying the coating liquid. Thus, the reflector (polarizing plate) can be readily formed by using a target object of the image projection (e.g., windshield of an automobile) by the light irradiation device as the substrate, applying coating liquid on the substrate, and then drying the coating liquid.

The polarizing plate of the present invention is not particularly limited as long as the polarizing plate reflects 10% or more of the output light by the absorption axis thereof, and has a single transmittance in a range of 30% to 90%.

Examples of such polarizing plate include, for example, a wire-grid polarizing plate, and a polarizing plate containing an organic dye (i.e., a polarizing plate including a polarizer containing an organic dye having lyotropic liquid crystallinity).

A wire-grid polarizing plate has a configuration such that straight metal wires (thin wires) are arranged on a substrate member regularly in a specific direction. A wire-grid polarizing plate can have different optical polarization characteristics by changing the thickness, wire interval, and/or alignment direction of the metal wires.

The polarizing plate containing an organic dye includes a polarizer, and in the polarizer, the organic dyes form supramolecular aggregates. As used herein, the term "supramolecular aggregate" denotes a large composite formed of a plurality of organic dye molecules associated with one another by hydrogen bonding or similar mechanism. As used herein, the term "lyotropic liquid crystallinity" refers to a nature of the organic dye characterized in that a change in temperature and/or in concentration of the coating liquid containing the organic dye and a solvent causes a phase transition of isotropic phase-liquid crystal phase in the organic dye.

A polarizer containing organic dyes forming supramolecular aggregates can be obtained by, for example, applying coating liquid containing a suitable organic dye and a suitable solvent, and then drying the coating liquid.

An organic dye contained in a polarizer is not particularly limited as long as the organic dye satisfies the above-mentioned reflectance and single transmittance.

Such an organic dye may be, for example, an azo based compound, an anthraquinone based compound, a perylene based compound, a quinophthalone based compound, a naphthoquinone based compound, a merocyanine based compound and the like. The azo based compound is used preferably since it exhibits a good lyotropic liquid crystallinity.

Among the azo based compounds, an azo compound having an aromatic ring in its molecule is preferable, and a disazo compound having a naphthalene ring is more preferable. A polarizer satisfying the above-mentioned reflectance and single transmittance can be obtained by coating and drying a coating liquid containing such an azo based compound.

Further, the azo based compound is preferably has a polar group in its molecule. An azo based compound having a polar group is soluble in an aqueous solvent and is likely to form supramolecular aggregates by being dissolved in the aqueous solvent. For this reason, a coating liquid containing an azo based compound having a polar group exhibits an especially good lyotropic liquid crystallinity.

Here, the polar group means a functional group having a polarity. The polar group may be, for example, a functional group containing oxygen and/or nitrogen having a comparatively large electronegativity such as OH group, COOH group, $NH_2$ group, $NO_2$ group, or CN group.

Examples of preferable azo based compound having a polar group include, for example, aromatic disazo compounds represented by the general formula (1) given below. In particular, a polarizer containing an aromatic disazo compound represented by the general formula (1) has a high reflectance for polarized light component along the absorption axis, and has a high single transmittance. Thus, use of an aromatic disazo compound represented by the general formula (1) as a formation material of the polarizer permits the polarizing plate of the present invention to be readily produced.

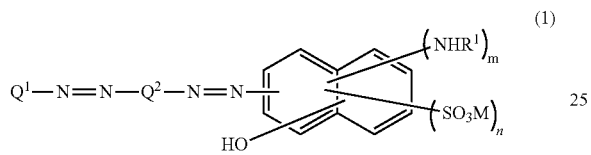

(1)

In the general formula (1), $Q^1$ represents a substituted or non-substituted aryl group, $Q^2$ represents a substituted or non-substituted arylene group, $R^1$ independently represents a hydrogen atom, a substituted or non-substituted alkyl group, a substituted or non-substituted acetyl group, a substituted or non-substituted benzoyl group, or a substituted or non-substituted phenyl group, M represents a counter ion, m represents an integer of 0 to 2, n represents an integer of 0 to 6. However, at least one of m and n is not 0, and $1 \leq m+n \leq 6$. If m is 2, each $R^1$ may be the same or different.

The groups OH, $(NHR^1)_m$, and $(SO_3M)_n$ shown in the general formula (1) may each be bonded to any one of the seven substitution sites of the naphthyl ring.

In the present specification, "substituted or non-substituted" means "substituted with a substituent group or not substituted with a substituent group".

The bonding position of the naphthyl group and the azo group (—N=N—) in the general formula (1) is not particularly limited. The naphthyl group indicates the naphthyl group shown on the right side in the formula (1). Preferably, the naphthyl group and azo group are bonded at the 1-position or the 2-position of the naphthyl group.

When the alkyl group, acetyl group, benzoyl group, or phenyl group of $R^1$ of the general formula (1) has a substituent group, the substituent group may be, for example, any of the substituent groups exemplified in the following aryl group or arylene group.

$R^1$ is preferably a hydrogen atom, a substituted or non-substituted alkyl group, a substituted or non-substituted acetyl group, more preferably a hydrogen atom.

The substituted or non-substituted alkyl group may be a substituted or non-substituted alkyl group with a carbon number of 1 to 6.

In the general formula (1), M (counter ion) is preferably a hydrogen ion; an alkali metal ion such as Li, Na, K, Cs and the like; an alkaline-earth metal ion such as Ca, Sr, Ba and the like; other metal ions; an ammonium ion that may be substituted by an alkyl group or a hydroxyalkyl group; a salt of an organic amine; and the like. The metal ion includes, for example, $Ni^+$, $Fe^{3+}$, $Cu^{2+}$, $Ag^+$, $Zn^{2+}$, $Al^{3+}$, $Pd^{2+}$, $Cd^{2+}$, $Sn^{2+}$, $Co^{2+}$, $Mn^{2+}$, $Ce^{3+}$, and the like. The organic amine may be an alkylamine with a carbon number of 1 to 6, an alkylamine with a carbon number of 1 to 6 having a hydroxyl group, an alkylamine with a carbon number of 1 to 6 having a carboxyl group. In the above general formula (1), when two or more $SO_3M$ groups are present, each M may be the same or different. Also, when M of the $SO_3M$ group is a divalent or more-valent cation in the above general formula (1), M is stabilized by being electrostatically bonded to other anions or M may be bonded to the adjacent $SO_3$ of another azo based compound of the general formula (1) to form supramolecular aggregates.

In the general formula (1), m is preferably 1. Also, n in the general formula (1) is preferably 1 or 2.

Specific examples of the naphthyl group in the general formula (1) includes, for example, the following formulae (a) to (l) and the like. $R^1$ and M of the formulae (a) to (l) are the same as those in the general formula (1).

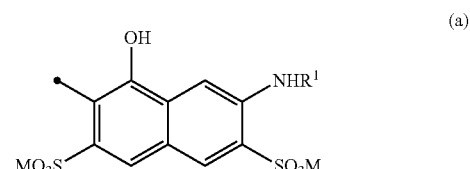

(a)

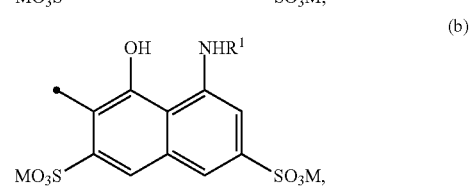

(b)

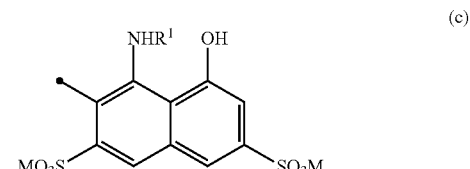

(c)

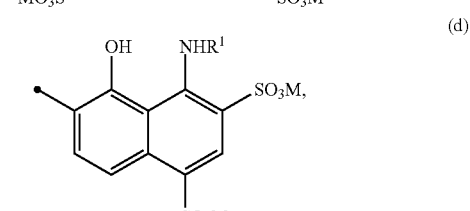

(d)

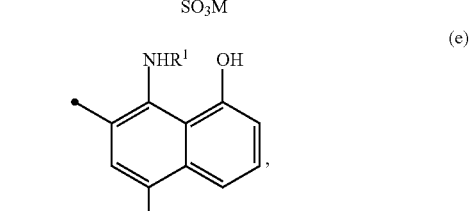

(e)

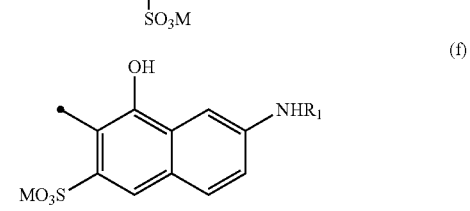

(f)

(g)

(h)

(i)

(j)

(k)

(l)

In the general formula (1), the aryl group represented by $Q^1$ may be a condensed-ring group in which two or more benzene rings are condensed, such as a naphthyl group besides a phenyl group.

The arylene group represented by $Q^2$ may be a condensed-ring group in which two or more benzene rings are condensed, such as a naphthylene group besides a phenylene group.

The aryl group of $Q^1$ or the arylene group of $Q^2$ may or may not each have a substituent group. Whether the aryl group or the arylene group is substituted or non-substituted, the aromatic disazo compound of the general formula (1) having a polar group has excellent solubility in an aqueous solvent.

When the aryl group or the arylene group has a substituent group, the substituent group includes, for example, an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group, a sulfonic acid group such as a $SO_3M$ group, a hydroxyl group, a cyano group, a nitro group, an amino group, a halogeno group, and the like. Preferably, the substituent group is the one selected from an alkoxy group with a carbon number of 1 to 6, a hydroxyalkyl group with a carbon number of 1 to 6, a carboxyl group, a sulfonic acid group, and a nitro group. The aromatic disazo compound having such a substituent group is particularly excellent in water solubility. These substituent groups may be substituted with one kind or with two or more kinds. Also, the substituent groups may be substituted at an arbitrary ratio.

$Q^1$ in the general formula (1) is preferably a substituted or non-substituted phenyl group, more preferably a phenyl group having the substituent group.

The $Q^2$ is preferably a substituted or non-substituted naphthylene group, more preferably a naphthylene group having the substituent group, particularly preferably a 1,4-naphthylene group having the substituent group.

An aromatic disazo based compound in which $Q^1$ in the general formula (1) is a substituted or non-substituted phenyl group and $Q^2$ is a substituted or non-substituted 1,4-naphthylene group is represented by the following general formula (2).

(2)

$R^1$, M, m, and n in the general formula (2) are the same as those in the general formula (1).

In the general formula (2), A and B represent a substituent group, and a and b represent a substitution number thereof. A and B independently represent an alkyl group with a carbon number of 1 to 6, an alkoxy group with a carbon number of 1 to 6, an alkylamino group with a carbon number of 1 to 6, a phenylamino group, an acylamino group with a carbon number of 1 to 6, a hydroxyalkyl group with a carbon number of 1 to 6 such as a dihydroxypropyl group, a carboxyl group such as a COOM group, a sulfonic acid group such as a $SO_3M$ group, a hydroxyl group, a cyano group, a nitro group, an amino group, a halogeno group. Further, a represents an integer of 0 to 5, and b represents an integer of 0 to 4. However, at least one of a and b is not 0. When a is 2 or more, the substituent groups A may be the same or different. When b is 2 or more, the substituent groups B may be the same or different.

Among the aromatic disazo compounds included in the general formula (2), it is preferable to use the aromatic disazo compound shown in the following general formula (3). In the aromatic disazo compound of the general formula (3), the substituent group A is bonded to the para-position with the azo group (—N=N—) serving as a standard. Further, in the aromatic disazo compound of the general formula (3), OH group of the naphthyl group is bonded to a position adjacent to the azo group (ortho position). When such an aromatic disazo compound of the general formula (3) is used, a polarizer having satisfactory reflectance and single transmittance can be easily formed.

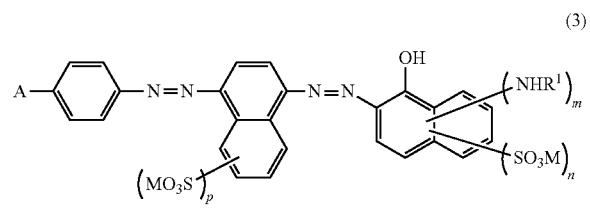

(3)

$R^1$, M, m, and n in the general formula (3) are the same as those in the general formula (1), and A is the same as the one in the general formula (2).

In the general formula (3), p represents an integer of 0 to 4. Further, p is preferably 1 or 2, more preferably 1.

The aromatic disazo compound shown in the above general formulae (1) to (3) can be synthesized according to, for example, "Riron Seizo Senryo Kagaku (Theoretical Production, Dye Chemistry) $5^{th}$ edition" by Yutaka Hosoda, published on Jul. 15, 1968, GIHODO SHUPPAN Co., Ltd., pages 135 to 152.

For example, the aromatic disazo compound of the above general formula (3) can be synthesized by obtaining a monoazo compound through diazotization and coupling reaction between an aniline derivative and a naphthalene sulfonic acid derivative, after that, this monoazo compound further goes through diazotization and further a coupling reaction with 1-amino-8-naphthol sulfonic acid derivative.

As has been discussed above, the first embodiment of the present invention assumes that the output light is linearly polarized. However, the output light is not limited to linearly polarized light in the present invention, and may be circularly polarized light or elliptically polarized light. Hereinafter, description will be presented in terms of a second embodiment of the present invention, in which the output light is circularly polarized.

Note that the description of the second embodiment presented below primarily describes regarding a configuration different from that of the first embodiment. Elements and components identical or similar to those of the first embodiment may not be described below, and may be described using the same terms and reference numerals as those of the first embodiment.

Second Embodiment

Figure 3:
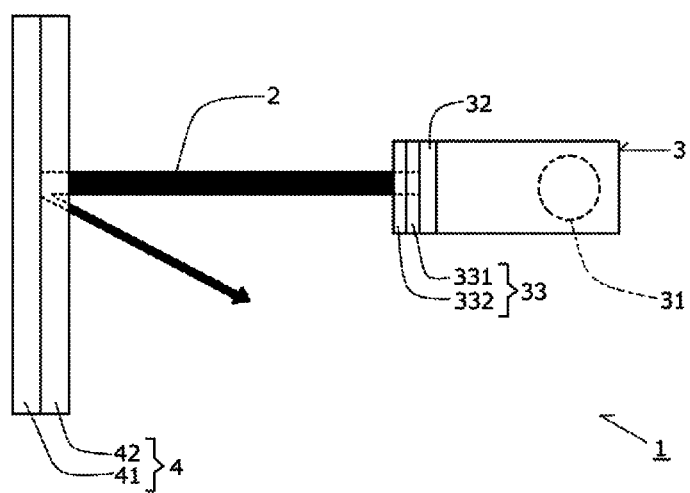
FIG. 3 is a conceptual diagram illustrating a projection apparatus of the present invention according to a second embodiment.

FIG. 3 is a schematic diagram of a projection apparatus 1 according to a second embodiment of the present invention.

In this embodiment, the output light 2 (one specific polarized light component) emitted from the light irradiation device 3 is circularly polarized light having an electric field direction rotating clockwise or counterclockwise (i.e., right-circularly polarized light or left-circularly polarized light, respectively). Right-circularly polarized light and left-circularly polarized light have oscillation directions perpendicular to each other.

The light irradiation device 3 of this embodiment is a projector similar to that of the first embodiment except for the extraction polarizing plate 33 attached on the lens 32 of the projector 3. The extraction polarizing plate 33 of this embodiment differs from that of the first embodiment in extracting circularly polarized light (output light 2) from the light emitted from the light source 31 of the projector 3.

The extraction polarizing plate 33 of this embodiment includes a polarizer 331 and a retardation film 332, and is attached to the lens 32 of the projector 3 such that the polarizer 331 is disposed at the innermost position. Thus, when a light is emitted from the light source 31 (halogen lamp) of the projector 3, the polarizer 331 of the extraction polarizing plate 33 extracts linearly polarized light from the emitted light, and the retardation film 332 stacked on the polarizer 331 then converts the extracted linearly polarized light into right- or left-circularly polarized light. Thus, in this embodiment, the output light 2 consists substantially of one specific polarized light component (circularly polarized light).

The retardation film for use in the extraction polarizing plate of this embodiment is not particularly limited, and may be any element as long as it can convert linearly polarized light into circularly polarized light. However, the retardation film is typically a quarter-wavelength retardation plate.

The formation material of the quarter-wavelength retardation plate is not particularly limited. Examples thereof include polyolefins (polyethylene, polypropylene, polynorbornene, etc.), amorphous polyolefins, polyimides, polyamide-imides, polyamides, polyetherimide, polyether ether ketone, polyether ketone, polyketone sulfide, polyether sulfone, polysulfones, polyphenylene sulfide, polyphenylene oxides, polyethylene terephthalate, polybutylene terephthalate, polyethylene naphthalate, polyacetals, polycarbonates, polyarylates, polymethyl methacrylate, polymethacrylates, polyacrylates, polystyrene, polypropylene, polynorbornene, and cellulose-based polymers (triacetyl cellulose (TAC), etc.). These formation materials may be used alone or in combination of two or more kinds. A quarter-wavelength retardation plate can be produced by forming a film from one or more of these formation materials, and performing a drawing process or the like to appropriately adjust the thickness.

In the present invention, the quarter-wavelength retardation plate preferably has a relationship of nx>ny>nz or nx>nz>ny. As used with respect to the quarter-wavelength retardation plate, "nx" represents the refractive index along the slow axis direction, and "ny" represents the refractive index along the fast axis direction.

In addition, the quarter-wavelength retardation plate preferably has an in-plane retardation that exhibits wavelength dispersion lower at a shorter wavelength and higher at a longer wavelength in a visible wavelength range of at least 360 nm to 830 nm. Such wavelength dispersion may be referred to as "reverse wavelength dispersion."

The quarter-wavelength retardation plate also has an optical property to convert linearly polarized light into circularly polarized light at least in the visible wavelength range.

More specifically, the quarter-wavelength retardation plate preferably has an in-plane retardation $Re(\lambda)$ in a wavelength range of at least 360 nm to 830 nm, satisfying an equation: $\frac{1}{4} \times \lambda \text{ (nm)} \times 0.8 \leq Re(\lambda) \leq \frac{1}{4} \times \lambda \text{ (nm)} \times 1.2$. Herein, $Re(\lambda)$ represents the in-plane retardation at a wavelength $\lambda$ (nm), and is calculated by Re(λ)=(nx−ny)×d, where d represents the thickness (nm) of the quarter-wavelength retardation plate.

Figure 4:
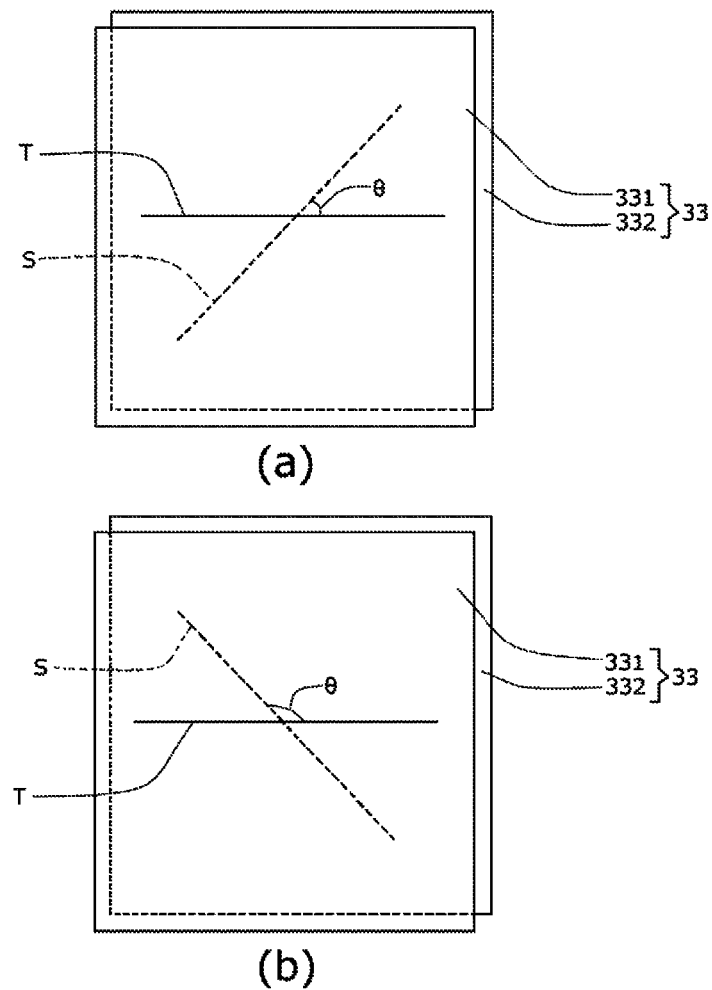
FIGS. 4(a) and 4(b) are referential figures each showing a relationship between the transmission axis of the polarizer and the slow axis of the quarter-wavelength retardation plate of the extraction polarizing plate.

As illustrated in FIG. 4(a), if right-circularly polarized light is to be extracted by using the extraction polarizing plate 33, the quarter-wavelength retardation plate 332 is laminated on the outer side of the polarizer 331 with an angle θ of 45° in a counterclockwise direction as viewed from the polarizer 331 side (or, from the light irradiation device 3 side), where the angle θ represents the angle formed by the slow axis S (broken line) of the quarter-wavelength retardation plate 332 with respect to the transmission axis T (solid line) of the polarizer 331.

As illustrated in FIG. 4(b), if left-circularly polarized light is to be extracted by using the extraction polarizing plate 33, the quarter-wavelength retardation plate 332 is laminated on the outer side of the polarizer 331 with an angle θ of 135° in a counterclockwise direction as viewed from the polarizer 331 side (or, from the light irradiation device 3 side), where the angle θ represents the angle formed by the slow axis S (broken line) of the quarter-wavelength retardation plate 332 with respect to the transmission axis T (solid line) of the polarizer 331.

In this embodiment, the polarizing plate 4, which also serves as a reflector, includes a polarizer 41 and a retardation film 42, which is a substrate. The polarizing plate 41 is disposed so that the output light 2 (right-circularly polarized light or left-circularly polarized light) is absorbed and reflected by the absorption axis.

More specifically, the polarizing plate 4 includes the retardation film 42 (substrate) and the polarizer 41 sequentially from inside to outside. Thus, the output light 2 (circularly polarized light) is first converted into linearly polarized light by the retardation film 42 of the polarizing plate 4, and the output light 2 converted into linearly polarized light is then absorbed and reflected by the absorption axis of the polarizer 41 stacked on the retardation film 42.

The retardation film 42 of the polarizing plate 4 is not particularly limited as long as it can convert right- or left-circularly polarized light into linearly polarized light, but is typically the quarter-wavelength retardation plate as described above.

Figure 5:
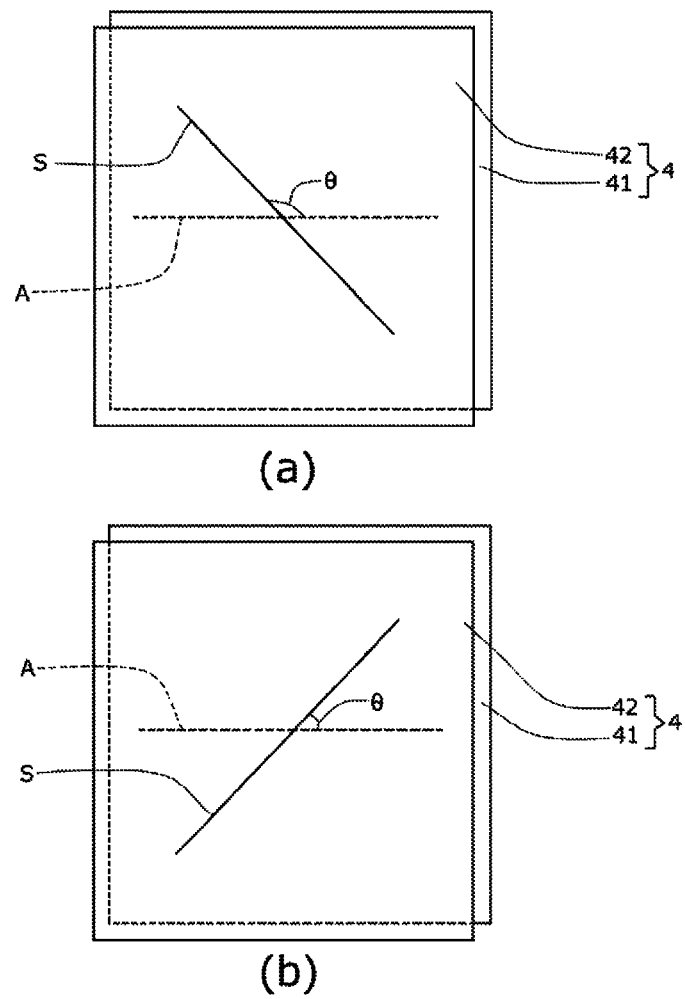
FIGS. 5(a) and 5(b) are referential figures each showing a relationship between the absorption axis of the polarizer and the slow axis of the quarter-wavelength retardation plate of the polarizing plate.

If the polarizing plate 4 is to absorb and reflect the output light 2 that is right-circularly polarized light, the quarter-wavelength retardation plate 42 of the polarizing plate 4 is laminated on the inner side of the polarizer 41 with an angle θ of 135° in a counterclockwise direction as viewed from the quarter-wavelength retardation plate 42 side as illustrated in FIG. 5(a), where the angle θ represents the angle formed by the slow axis S (solid line) of the quarter-wavelength retardation plate 42 with respect to the absorption axis A (broken line) of the polarizer 41.

On the contrary, if the polarizing plate 4 is to absorb and reflect the output light 2 that is left-circularly polarized light, the quarter-wavelength retardation plate 42 of the polarizing plate 4 is laminated on the inner side of the polarizer 41 with an angle θ of 45° in a counterclockwise direction as viewed from the quarter-wavelength retardation plate 42 side as illustrated in FIG. 5(b), where the angle θ represents the angle formed by the slow axis S (solid line) of the quarter-wavelength retardation plate 42 with respect to the absorption axis A (broken line) of the polarizer 41.

Disposing the polarizing plate 4 as described above first causes the quarter-wavelength retardation plate 42 to convert the output light 2 (right- or left-circularly polarized light) into linearly polarized light having an oscillation direction parallel to the absorption axis direction of the polarizer 41, and then allows the absorption axis A of the polarizer 41 to absorb and reflect the output light 2 converted into linearly polarized light.

Also in this embodiment, the reflectance of the polarizing plate for the output light is 10% or more, and the single transmittance of the polarizing plate is in a range of 30% to 90%. Thus, the projection apparatus of this embodiment is capable of clearly displaying a projected image, and allowing the sight behind the polarizing plate to be viewed to a sufficient degree. The polarizer of the polarizing plate is similar to that of the first embodiment described above.

As described above, an angle formed by the slow axis of the quarter-wavelength retardation plate 332 with respect to the transmission axis of the polarizer 331 of 45° or 135° in a counterclockwise direction in the extraction polarizing plate 33 permits extraction of right- or left-circularly polarized light. Changing this angle also permits extraction, as the output light 2, of elliptically polarized light having an electric field direction rotating clockwise (right-elliptically polarized light) or counterclockwise (left-elliptically polarized light).

In this case, the polarizing plate 4 is configured to absorb and reflect the elliptically polarized light, which is the output light 2, by the absorption axis. More specifically, changing the angle formed by the slow axis of the quarter-wavelength retardation plate 42 with respect to the absorption axis of the polarizer 41 based on the extraction polarizing plate 33 can achieve the polarizing plate 4 that absorbs and reflects the output light 2 (elliptically polarized light) by the absorption axis.

The projection apparatus of the present invention has a reflectance of the reflector (polarizing plate) for the output light of 10% or more, and can therefore reflect the output light to a sufficient degree. This permits a sharp image to be projected. In addition, the single transmittance of the polarizing plate in a range of 30% to 90% permits the sight behind the polarizing plate to be perceived (viewed) to a sufficient degree through the polarizing plate from inside the projection apparatus.

[Method for Producing Polarizing Plate]

The polarizing plate of the present invention can be produced, for example, by steps B and C described below. Step A may be performed before step B, and step D may be performed after step C, as needed.

Step A: An alignment treatment is performed on a surface of a substrate.

Step B: Coating liquid containing an organic dye having lyotropic liquid crystallinity is applied on the surface of the substrate to form a coating film.

Step C: The coating film is dried to form a dry coating film as the polarizer.

Step D: A water-resistant treatment is performed on a surface of the polarizer formed in step C.

<Step A>

In step A, performing an alignment treatment on the surface of the substrate provides an alignment regulating force to the surface of the substrate. If a substrate preliminarily provided with an alignment regulating force is used, step A is not required.

Examples of method for providing an alignment regulating force include rubbing the surface of the substrate; forming a film formed of polyimide or the like on the surface of the substrate, and rubbing the surface of the film; and forming a film formed of a photoreactive compound on the surface of the substrate, and irradiating the film with light to form an alignment film.

<Step B>

Step B is a step of forming a coating film using coating liquid.

The coating liquid contains the organic dye and a solvent dissolving or dispersing the organic dye. The coating liquid can be obtained by dissolving or dispersing the organic dye in the solvent. As an organic dye, an aromatic disazo compound represented by the following general formula (1) is preferably used.

Polymers other than an organic dye and/or optional additives and the like may be added to the solvent as needed.

The solvent is not particularly limited, but the conventionally known solvent can be used and an aqueous solvent is preferably used. Examples of the aqueous solvent include water, a hydrophilic solvent, and a mixed solvent containing water and the hydrophilic solvent. The hydrophilic solvent is a solvent that can be dissolved in water approximately uniformly. Examples of the hydrophilic solvent include alcohols such as methanol, isopropyl alcohol, and the like; glycols such as ethylene glycol, and the like; cellosolves such as methyl cellosolve, ethyl cellosolve, and the like; ketones such as acetone, methyl ethyl ketone, and the like; esters such as ethyl acetate and the like. The aqueous solvent is preferably water or the mixed solvent containing water and the hydrophilic solvent.

Coating liquid exhibits a lyotropic liquid crystal phase by changing the temperature or the concentration of an organic dye and the like. The lyotropic liquid crystal phase is exhibited by the organic dyes forming spramolecular aggregates in the liquid. The lyotropic liquid crystal phase can be confirmed and identified from an optical pattern when observed by using a polarization microscope.

The concentration of the organic dye in the coating liquid is preferably adjusted so that the organic dye exhibits a lyotropic liquid crystal phase. The concentration of the organic dye in the coating liquid is typically in a range of 0.05% by weight to 50% by weight, preferably 0.5% by weight to 40% by weight, more preferably 1% by weight to 10% by weight.

The coating liquid is also adjusted to have a suitable pH. The pH of the coating liquid is preferably in a range of about pH 2 to 10, more preferably about pH 6 to 8.

The temperature of the coating liquid is preferably adjusted in a range of 10° C. to 40° C., more preferably 15° C. to 30° C.

Application of the coating liquid to the substrate leads to formation of the coating film. In the coating film, the organic dye is aligned in the predetermined direction due to the alignment regulating force of the substrate.

The method of applying the coating liquid is not particularly limited. For example, an application technique using a conventionally known coater may be used. Examples of such coater include a bar coater, a roll coater, a spin coater, a comma coater, a gravure coater, an air knife coater, and a die coater.

<Step C>

In step C, a dry coating film is formed as the polarizer. Forming a dry coating film on the substrate as the polarizer provides a polarizing plate including the substrate and the polarizer.

Drying the coating film formed in step B causes volatilization of the solvent contained in the coating film, and thus a dry coating film (polarizer) containing a solid organic dye is formed. In the polarizer, the organic dye has its orientation being fixed while supramolecular aggregates are still present therein.

The technique for drying the coating film is not particularly limited, but natural drying or forced drying may be used. Techniques of forced drying include, for example, vacuum drying, heat drying, and vacuum heat drying. Preferably, natural drying is used.

The drying time for the coating film may be suitably selected depending on the drying temperature and/or the solvent used. For example, the drying time for natural drying is preferably from 1 second to 120 minutes, and more preferably from 10 seconds to 5 minutes.

The drying temperature is not particularly limited, but is preferably in a range of 10° C. to 100° C., more preferably from 10° C. to 90° C., and particularly preferably from 10° C. to 80° C.

As used herein, the drying temperature refers to the temperature of the atmosphere used to dry the coating film, not the temperature of a surface or the inside of the coating film.

<Step D>

Step D is a step to impart water resistance by bringing water-resistant treatment liquid into contact with the polarizer.

The technique to bring the water-resistant treatment liquid into contact with the polarizer is not particularly limited. Examples of the contacting technique include (a) application of water-resistant treatment liquid on the surface of the polarizing plate (polarizer), (b) immersion of the polarizing plate in a bath filled with water-resistant treatment liquid, and (c) passing the polarizing plate through a bath filled with water-resistant treatment liquid. The application of water-resistant treatment liquid set forth as technique (a) can be carried out by using a suitable coater, spray, or similar means.

The water-resistant treatment liquid is not particularly limited, and a conventionally known material can be used. The water-resistant treatment liquid includes, for example, a crosslinking agent capable of crosslinking the organic dye, and a solvent dissolving or dispersing the crosslinking agent.

Examples of the crosslinking agent include an organic nitrogen compound, and examples of the solvent include an aqueous solvent.

The organic nitrogen compound is preferably an acyclic organic nitrogen compound having two or more cationic groups (preferably cationic groups each having a nitrogen atom) in the molecule. Examples of the acyclic organic nitrogen compound (acyclic aliphatic nitrogen compound) include aliphatic diamines such as alkylene diamines, and salts thereof, aliphatic triamines such as alkylene triamines, and salts thereof, aliphatic tetraamines such as alkylene tetraamines, and salts thereof aliphatic pentaamines such as alkylene pentaamines, and salts thereof, and aliphatic ether diamines such as alkylene ether diamines, and salts thereof.

The aqueous solvent may be one of those exemplified in the step B section.

The concentration of the crosslinking agent in the water-resistant treatment liquid is preferably in a range of 1% by mass to 50% by mass, more preferably 5% by mass to 30% by mass.

Bringing the water-resistant treatment liquid into contact with the polarizer causes the organic dyes in the polarizer to be crosslinked via the crosslinking agent. This crosslinking process can form a polarizer having excellent water resistance and mechanical strength.

[Application of Projection Apparatus]

The projection apparatus of the present invention may be used by being incorporated in a navigation system for vehicles (e.g., automobiles). If the projection apparatus of the present invention is mounted in an automobile, the polarizing plate is preferably implemented on the windshield. However, an image may be projected onto a polarizing plate prepared separately from the windshield.

Application of the projection apparatus of the present invention to a vehicle enables a projected image to be clearly displayed, and the sight behind the polarizing plate to be viewed therethrough to a sufficient degree. Thus, the driver obtains various information during driving the vehicle without moving his or her eyes away from the traveling direction, and accordingly, safe driving of the vehicle is achieved.

The projection apparatus of the present invention may also be applied to a smart window.

A smart window is a type of light control window capable of adjusting the amount of light transmission to practically any degree by means of electric power. A smart window is structured such that, for example, a layer of particular organic dye is imposed between two substrates. Application of a voltage to the smart window causes the organic dye to be aligned in a specific direction, and the magnitude of the voltage determines the orientation of the organic dye. Change in the orientation of the organic dye allows the amount of light transmission to be adjusted. Use of the polarizing plate of the present invention as the substrate of such a smart window permits an image to be projected on the smart window.

EXAMPLES

Hereafter, the present invention will be further described in detail by showing Examples and Comparative Examples. However, the present invention is not particularly limited to the following Examples. Here, the measuring methods used in Examples and Comparative Examples are as follows.

[Method for Measuring Reflectance]

Depending on the conditions of Examples and Comparative Examples, the polarizing plate was irradiated with a polarized light component (irradiation light) extracted by a Glan-Taylor polarizer or a right-circularly polarizing plate placed in the optical path at 23° C., and then the ratios of reflected light to irradiation light (100%) were measured using an ultraviolet (UV)-visible-near-infrared (NIR) spectrophotometer (manufactured by Hitachi High-Technologies Corporation, trade name "U-4100"). The values of tristimulus value Y based on a 2-degree observer according to JIS Z8701-1995 were used as the measurement results.

[Method for Measuring Single Transmittance]

Single transmittances of the polarizing plates were measured using the UV-visible-NIR spectrophotometer used in the measurement of reflectance and using a depolarization filter placed in the optical path. The values of tristimulus value Y based on a 2-degree observer according to JIS Z8701-1995 obtained at a wavelength of 590 nm at 23° C. were used as the measurement results.

[Synthesis of Organic Dye]

A monoazo compound was obtained by diazotization and the coupling reaction between 4-nitroaniline and 8-amino-2-naphthalene sulfonic acid in the usual manner ("Riron Seizo Senryo Kagaku (Theoretical Production, Dye Chemistry) 5$^{th}$ edition" by Yutaka Hosoda), published on Jul. 15, 1968, GIHODO SHUPPAN Co., Ltd., pages 135 to 152. The obtained monoazo compound was diazotized in the usual manner, and further a crude product was obtained by coupling reaction with 1-amino-8-naphthol-2, 4-disulfonic acid lithium salt. The aromatic disazo compound represented by the following structural formula (4) was obtained by salting out this composition with a lithium chloride.

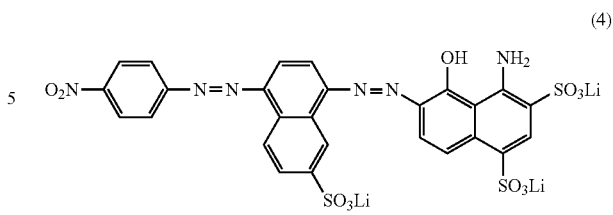

(4)

Example 1

A norbornene-based polymer film (manufactured by Zeon Corporation, Japan, trade name "ZEONOR") was prepared, and a rubbing treatment and a hydrophilization treatment (corona treatment) were performed on the surface of the film to form the substrate.

An aromatic disazo compound represented by structural formula (4) shown above was dissolved in ion-exchanged water to prepare coating liquid having a concentration of 4% by weight.

The coating liquid was applied on the rubbed surface of the substrate using a bar coater (manufactured by BUSCHMAN Co., Ltd., trade name "Mayer rot HS3"), and was then naturally dried in a temperature-controlled chamber at a temperature of 23° C. to form a dry coating film (polarizer) on the surface of the substrate. This produced a polarizing plate formed of a laminate having the substrate and the polarizer.

The surface of the polarizing plate (polarizer) was irradiated with a linearly polarized light having an oscillation direction parallel to the absorption axis direction of the polarizing plate, and both reflectance and single transmittance of the polarizing plate were measured using the methods described above. In addition, an image displayed on a liquid crystal display (LCD) was projected onto the polarizing plate, and sharpness of the projected image was evaluated. The above-mentioned image includes a linearly polarized light having an oscillation direction parallel to that of the linearly polarized light used for measuring the reflectance. See-through property of the polarizing plate (viewability of the sight behind the polarizing plate) was also evaluated during the projection of the image displayed on the LCD. The results are summarized in Table 1 shown below.

In the cells under the column heading "Evaluation of projected image" of Table 1, the wording "High" indicates that the projected image was clearly perceived, while the wording "Low" indicates that the projected image was perceived as being unsharp. In the cells under the column heading "Evaluation of see-through property" of Table 1, the wording "High" indicates that the sight behind the polarizing plate could be viewed therethrough to a sufficient degree, the wording "Moderate" indicates that the sight behind the polarizing plate could be viewed therethrough, but the projected image was displayed slightly too clearly on the polarizing plate, and the wording "Low" indicates that the sight behind the polarizing plate could not be viewed therethrough to a sufficient degree.

Example 2

A one-axis drawing process was carried out on a norbornene-based polymer film identical to that used in Example 1 to form a quarter-wavelength retardation plate.

Then, a rubbing treatment and a hydrophilization treatment were performed on the surface of the quarter-wavelength retardation plate similarly to Example 1 to form the substrate.

Application of the coating liquid identical to that used in Example 1 under the same conditions as Example 1, and drying the applied coating liquid, caused a polarizing plate to be formed which is formed of a laminate having the substrate and the polarizer. The polarizing plate was produced so that the angle formed by the slow axis of the substrate (quarter-wavelength retardation plate) with respect to the absorption axis of the polarizer is 135° in a counter-clockwise direction as viewed from the substrate side. This means that the polarizing plate produced was a left-circularly polarizing plate (i.e., a polarizing plate that passes left-circularly polarized light, and absorbs and reflects right-circularly polarized light).

The surface of the polarizing plate (quarter-wavelength retardation plate) was irradiated with a right-circularly polarized light, and both reflectance and single transmittance of the polarizing plate were measured using the methods described above. In addition, an image displayed on an LCD was projected onto the polarizing plate, and sharpness of the projected image was evaluated. The above-mentioned image includes a right-circularly polarized light having an oscillation direction parallel to that of the circularly polarized light used for measuring the reflectance. See-through property of the polarizing plate (viewability of the sight behind the polarizing plate) was also evaluated during the projection of the image displayed on the LCD. The results are summarized in Table 1 shown below.

Example 31

A polarizing plate was produced similarly to Example 1 except that coating liquid having a concentration of 1.5% by weight was used. Both reflectance and single transmittance were measured, and sharpness of the projected image and see-through property were evaluated. The results are summarized in Table 1 shown below.

Example 41

A polarizing plate was produced similarly to Example 1 except that a wire-grid polarizing plate (manufactured by Asahi Kasei E-materials Corporation, trade name "WGP") was used as the polarizing plate. Both reflectance and single transmittance were measured, and sharpness of the projected image and see-through property were evaluated. The results are summarized in Table 1 shown below.

Comparative Example 1

A polarizing plate identical to one produced in Example 1 was prepared.

The surface of the polarizing plate (polarizer) was irradiated with a linearly polarized light having an oscillation direction perpendicular to the absorption axis direction (or parallel to the transmission axis direction) of the polarizing plate, and both reflectance and single transmittance of the polarizing plate were measured using the methods described above. In addition, an image displayed on an LCD was projected onto the polarizing plate, and sharpness of the projected image was evaluated. The above-mentioned image includes a linearly polarized light having an oscillation direction parallel to that of the linearly polarized light used for measuring the reflectance. See-through property of the polarizing plate (viewability of the sight behind the polarizing plate) was also evaluated during the projection of the image displayed on the LCD. The results are summarized in Table 1 shown below.

Comparative Example 2

A polarizing plate identical to one produced in Example 2 was prepared.

The surface of the polarizing plate (quarter-wavelength retardation plate) was irradiated with a left-circularly polarized light, and both reflectance and single transmittance of the polarizing plate were measured using the methods described above. In addition, an image displayed on an LCD that emits a left-circularly polarized light having an oscillation direction parallel to that of the left-circularly polarized light used for measuring the reflectance was projected onto the polarizing plate, and sharpness of the projected image was evaluated. See-through property of the polarizing plate (viewability of the sight behind the polarizing plate) was also evaluated during the projection of the image displayed on the LCD. The results are summarized in Table 1 shown below.

Comparative Example 3

Both reflectance and single transmittance were measured similarly to Example 1 except that a non-polarizing neutral density (ND) filter (manufactured by SIGMAKOKI Co., Ltd., trade name "Absorptive Neutral Density Filter AND-50S-40") was used instead of the polarizing plate. In addition, an image displayed on an LCD that emits a linearly polarized light having any oscillation direction was projected onto the ND filter, and sharpness of the projected image was evaluated. See-through property of the ND filter (viewability of the sight behind the ND filter) was also evaluated during the projection of the image displayed on the LCD. The results are summarized in Table 1 shown below.

Comparative Example 4

Both reflectance and single transmittance were measured, and sharpness of a projected image and see-through property were evaluated similarly to Example 1 except that an iodine-based polarizing plate (manufactured by Nitto Denko Corporation, trade name "SEG1423DU") was used as the polarizing plate. The results are summarized in Table 1 shown below.

TABLE 1

| | Irradiation Light | Single Transmittance (%) | Polarized Reflectance (%) | Evaluation of Projected Image | Evaluation of See-through Property |
|---|---|---|---|---|---|
| Example 1 | Linearly Polarized Light | 41.7 | 18.1 | High | High |

TABLE 1-continued

| | Irradiation Light | Single Transmittance (%) | Polarized Reflectance (%) | Evaluation of Projected Image | Evaluation of See-through Property |
|---|---|---|---|---|---|
| Example 2 | Circularly Polarized Light | 41.6 | 15.5 | High | High |
| Example 3 | Linearly Polarized Light | 55.1 | 26.0 | High | High |
| Example 4 | Linearly Polarized Light | 44.1 | 83.5 | High | Moderate |
| Comparative Example 1 | Linearly Polarized Light | 41.4 | 5.4 | Low | High |
| Comparative Example 2 | Circularly Polarized Light | 41.5 | 5.3 | Low | High |
| Comparative Example 3 | Linearly Polarized Light | 40.1 | 4.6 | Low | High |
| Comparative Example 4 | Linearly Polarized Light | 42.3 | 3.8 | Low | High |

[Evaluation]

The polarizing plates (reflectors) of Examples 1 to 4 each have reflectance for the output light of 10% or more, thereby enabling a sharp projected image to be perceived; and each have single transmittance of 30% or more, thereby enabling the sight behind the polarizing plate to be viewed therethrough.

In contrast, the polarizing plates (reflectors) of Comparative Examples 1 to 4 each have single transmittance of 30% or more, and thus the sight behind the polarizing plate can be viewed therethrough to a sufficient degree, but the reflectance thereof less than 10% prevents the projected image from being clearly perceived.

In addition, a comparison between the polarizing plates (reflectors) of Examples 1 to 3 and the polarizing plate (reflector) of Example 4 shows that an excessively high reflectance (above 90%) for the output light causes the projected image to be too dense, and accordingly reduces the see-through property. The results in Table 1 also shows that the use of an aromatic disazo compound represented by the general formula (1) enables production of a polarizing plate excellent in visibility of the projected image and see-through property.

1 Projection apparatus, 2 Output light, 3 Light irradiation device, 31 light source, 33 Extraction polarizing plate, 4 Polarizing plate, 41 Polarizer, 42 Retardation film, A Absorption axis, T Transmission axis, S Slow axis

What is claimed is:

1. A projection apparatus comprising:
   a light irradiation device configured to emit an output light having one polarized light component; and
   a polarizing plate including a polarizer irradiated with the output light,
   wherein in the polarizing plate, an absorption axis is arranged to absorb and reflect the output light by the polarizing plate,
   reflectance of the polarizing plate for the output light is 10% or more,
   single transmittance of the polarizing plate is in a range of 30% to 90%, and
   the polarizer contains an aromatic disazo compound represented by the following general formula (1):

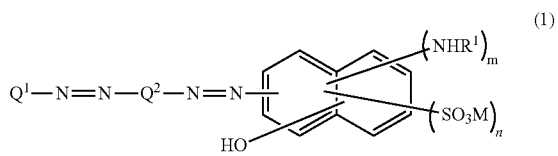

where $Q^1$ represents a substituted or unsubstituted aryl group; $Q^2$ represents a substituted or unsubstituted arylene group: $R^1$ independently represents a hydrogen atom, a substituted or unsubstituted alkyl group, a substituted or unsubstituted acetyl group, a substituted or unsubstituted benzoyl group, or a substituted or unsubstituted phenyl group; M represents a counter ion; m represents an integer of 0 to 2; and n represents an integer of 0 to 6, where at least one of m and n is not 0, and $1 \leq m+n \leq 6$; and if m is 2, each $R^1$ may be the same or different.

2. The projection apparatus according to claim 1, wherein the reflectance of the polarizing plate for the output light is 90% or less.

3. The projection apparatus according to claim 1, wherein the output light consists substantially of the one polarized light component.

4. The projection apparatus according to claim 1, wherein the output light is linearly polarized light, circularly polarized light, or elliptically polarized light.

5. The projection apparatus according to claim 1, wherein the light irradiation device is a projector, a liquid crystal display, an organic electroluminescence light-emitting device, or a laser projector.

6. The projection apparatus according to claim 1, wherein the polarizing plate serves as a light control window capable of adjusting a transmission quantity of light by means of electric power.

7. A vehicle including the projection apparatus according to claim 1.

* * * * *